United States Patent [19]
Van Evans et al.

[11] Patent Number: 5,806,752
[45] Date of Patent: Sep. 15, 1998

[54] MANUFACTURE OF ALUMINUM ASSEMBLIES BY OPEN-AIR FLAME BRAZING

[75] Inventors: Timothy Van Evans, Ypsilanti; Gerry A. Grab, Trenton, both of Mich.; Nathan Victor Carter, Plant City, Fla.; Matthew John Zaluzec, Canton, Mich.

[73] Assignee: Ford Global Technologies, Inc., Dearborn, Mich.

[21] Appl. No.: 760,017

[22] Filed: Dec. 4, 1996

[51] Int. Cl.⁶ .......................... B23K 31/02; B23K 35/363
[52] U.S. Cl. .................. 228/183; 228/233.2; 228/223
[58] Field of Search .................... 228/132, 183, 228/223, 233.2, 262.51; 148/26; 29/890.052, 890.054

[56] References Cited

U.S. PATENT DOCUMENTS

| | | |
|---|---|---|
| 2,312,039 | 2/1943 | Hoglund . |
| 3,081,534 | 3/1963 | Bredzs . |
| 3,395,001 | 7/1968 | Stroup et al. . |
| 3,440,712 | 4/1969 | Stroup et al. . |
| 3,782,929 | 1/1974 | Werner . |
| 3,788,824 | 1/1974 | Singleton, Jr. et al. . |
| 3,917,151 | 11/1975 | Robinson . |
| 3,963,454 | 6/1976 | Singleton, Jr. . |
| 4,146,163 | 3/1979 | Anderson et al. . |
| 4,357,397 | 11/1982 | Baba et al. . |
| 4,489,140 | 12/1984 | Pulliam et al. . |
| 4,560,625 | 12/1985 | Kaifu et al. . |
| 4,645,119 | 2/1987 | Haramaki et al. . |
| 4,727,001 | 2/1988 | Takemoto et al. . |
| 4,732,311 | 3/1988 | Hasegawa et al. . |
| 4,758,273 | 7/1988 | Gilman et al. . |
| 4,901,908 | 2/1990 | Negura et al. . |
| 4,988,036 | 1/1991 | Kemble et al. . |
| 5,148,862 | 9/1992 | Hashiura et al. . |
| 5,158,621 | 10/1992 | Das et al. . |
| 5,171,377 | 12/1992 | Shimizu et al. . |
| 5,180,098 | 1/1993 | Halstead et al. . |
| 5,232,521 | 8/1993 | Takahashi et al. . |
| 5,350,436 | 9/1994 | Takezoe et al. . |
| 5,398,864 | 3/1995 | Eichhorn et al. . |
| 5,422,191 | 6/1995 | Childree . |

*Primary Examiner*—Samuel M. Heinrich
*Attorney, Agent, or Firm*—Lorraine S. Melotik

[57] ABSTRACT

An open-air brazing method for manufacturing an assembly including at least one aluminum based tube having an internal surface and an external surface, applying an Aluminum Association 4XXX aluminum based filler material to at least a portion of the external surface of the tube, disposing at least one aluminum based component adjacent the filler material, and applying a modified aluminum brazing flux to a joint between the at least one tube and the at least one component to form a precursor assembly, said brazing flux comprising cesium fluoride, lithium fluoride, or their mixture added into a potassium fluoaluminate flux in an amount of at least about 1% by weight of the modified flux. The method further comprises joining the at least one tube and at least one component together in an open-air brazing furnace whereby the temperature is raised from about 450° C. to about 600° C. in about 15 to 20 seconds.

11 Claims, 2 Drawing Sheets

MANUFACTURE OF ALUMINUM ASSEMBLIES BY OPEN-AIR FLAME BRAZING

Reference is made to related U.S. patent application titled "Manufacture of Heat Exchanger Assembly by CAB Brazing" Ser. No. 08/627,871.

BACKGROUND OF THE INVENTION

1. Field of the Invention

The present invention relates generally to the manufacture of small aluminum assemblies, like tube-to-manifold assemblies for automotive vehicles, manufactured by in-line flame brazing, i.e., brazing in the open-air.

2. Description of the Related Art

It is known to provide automotive vehicles with aluminum or aluminum alloy heat exchanger assemblies like condensers, evaporators and coolers. To manufacture these assemblies from their component parts, e.g., tubes, fins, manifolds, the aluminum parts are generally joined together by brazing. The current leading technology in the industry for brazing aluminum (Al) heat exchanger components for automotive applications is Controlled Atmosphere Brazing (CAB). In CAB brazing, under a protective nitrogen atmosphere, the clad layer on the tube (or the fin), which has a melting point lower than that of the tube (or fin), melts at the brazing temperature and forms joints between the tube and the fins.

Aluminum oxide which forms on the surface of aluminum exposed to air interferes with the successful brazing together of aluminum surfaces. Although aluminum surfaces are cleaned prior to brazing to reduce the native aluminum oxide layer, the surface of the aluminum will tend to re-oxidize in the brazing furnace if oxygen is present. As in CAB brazing, the brazing furnace atmosphere is thus generally modified to eliminate oxygen. In addition, a flux is provided at the joint to disrupt any aluminum oxide on the surface of the aluminum, protect it from further oxidation, and reduce filler metal (i.e., cladding material) surface tension which promotes wetting of the filler metal to the aluminum surfaces. Chloride-based fluxes are not used because they are highly hygroscopic and very corrosive to aluminum. An aluminum brazing flux commonly used in CAB furnace brazing is a potassium fluoaluminate flux represented often as "KALF", commercially available, e.g., as Nocolok™.

It is highly desirable to increase the magnesium content in the aluminum alloy in order to increase its mechanical strength and thus durability. In addition, use of higher strength alloys will permit reducing the thickness of the aluminum component, e.g., tubing, thus reducing materials cost and assembly weight, the latter helping to increase fuel economy. It has widely been recognized that to successfully use the Nocolok flux, however, the magnesium content in the aluminum alloy must be below 0.1% by weight. Otherwise the magnesium diffuses to the surface of the aluminum at high brazing temperatures where it readily forms magnesium oxide. Magnesium oxides are not broken down by conventional aluminum fluxes such as KALF and hence interfere with the integrity of the brazed joint since such surface oxides reduce the "wetability" of the molten clad layer. If MgO or $Al_2O_3$ is present on the aluminum surface during brazing, if and when wetting by the filler material does occur, it leads to formation of a discontinuous, porous braze joint. Such joints are less than strong. In the U.S. patent application Ser. No. 08/627,871 noted above which is commonly owned and has common inventors, to overcome the MgO problem during CAB brazing, a modified flux is disclosed which includes lithium fluoride, cesium fluoride or their mixture added into an aluminum brazing flux like KALF.

There is still a strong commercial desire to carry out brazing of aluminum assemblies in the open-air as by flame brazing. Open-air brazing (sometimes alternately referred to as "flame-brazing") is particularly useful for in-line brazing of aluminum assemblies that are generally smaller than heat exchangers. That is, the assemblies to be brazed are generally put through an open-air furnace on a conveyor. Open-air brazing avoids the commercial complexities involved with providing a special atmosphere as in CAB brazing (nitrogen) and allows for high volume manufacturing of brazed aluminum assemblies. As discussed above, however, this techniques is not used because the relatively high level of oxygen in air makes attaining a sound braze joint very difficult due to rapid oxide formation. This is a particular problem when the magnesium level in the aluminum is high. Chloride based fluxes have been used in open-air brazing in an attempt to remove the oxide layers and allow sound joint formation. However, use of chloride based fluxes is less than desirable as pointed out above because they are hydroscopic and highly corrosive to the aluminum. We have now found a method for carrying out open-air brazing that produces continuous, sound braze joints without the use of highly corrosive chloride based fluxes.

SUMMARY OF THE INVENTION

Accordingly, the present invention is a method for manufacturing an automotive vehicle assembly using open-air brazing. The method comprises the steps of: providing at least one aluminum based tube having an internal surface and an external surface; applying an Aluminum Association 4XXX aluminum alloy filler material to a portion of the external surface of the tube; disposing at least one aluminum based component adjacent to the filler material and tube; applying a modified aluminum brazing flux to a joint between the at least one tube and the at least one component to form a precursor assembly, said modified aluminum brazing flux comprising cesium fluoride, lithium fluoride, or their mixture added into a potassium fluoaluminate flux in an amount of at least 1% by weight of the modified flux; and joining the at least one tube and at least one component together in an open-air flame brazing process which comprises subjecting the assembly to elevated temperatures in a furnace wherein the temperature is raised from about 450° to 600° C. in about 15 to 20 seconds.

Advantageously, according to the present invention, an assembly which has a desired higher level of magnesium in the aluminum materials for improved strength can still be brazed according to a preferred brazing process, i.e., open-air furnace brazing. The use of a conventional KALF flux such as Nocolok™ flux during the open-air brazing process would not allow for formation of a sound joint since it is not able to remove high levels of magnesium oxide that would readily form on the 6XXX aluminum surface. We have unexpectedly found, however, that by using the modified aluminum flux disclosed above and, in addition, radically accelerating the ramp up of the temperature during the open-air brazing process, strong braze joints are formed. In this invention, the modified flux is made by adding cesium fluoride and/or lithium fluoride in an into a KALF flux like e.g., Nocolox™.

We have found that the cesium and/or lithium additives in the modified flux are able to disrupt any MgO which may form aluminum surface during brazing and also prevent its reformation in the open-air. In addition, we have found that the melting point of the KALF flux significantly decreases with the addition of cesium and/or lithium fluoride into the KALF. The combination of lowered melting point and increased ramp-up of the braze temperature results surface oxide removal at lower temperature and improved filler metal wetting of the joint surfaces. The present invention method causes the area of the braze fillet to be significantly increased in size, i.e., from 30 to 100% or more, over that when unmodified KALF such as Nocolok™ is used with a conventional ramp-up. This method also allows for a KALF type flux to be used which is much more desirable than using a chloride type flux which is believed in some cases to be the only means to braze a high magnesium containing 6XXX aluminum alloy. The present invention modified flux has been found to advantageously disrupt the aluminum oxide layer and aid in the prevention of the formation of magnesium oxide at the joint area. As would be appreciated by those skilled in the art, these advantages will result in stronger brazed joints Other features and advantages of the present invention will become apparent from the following discussions taken in conjunction with the accompanying drawings.

DESCRIPTION OF THE PREFERRED EMBODIMENT(S)

Figure 1:
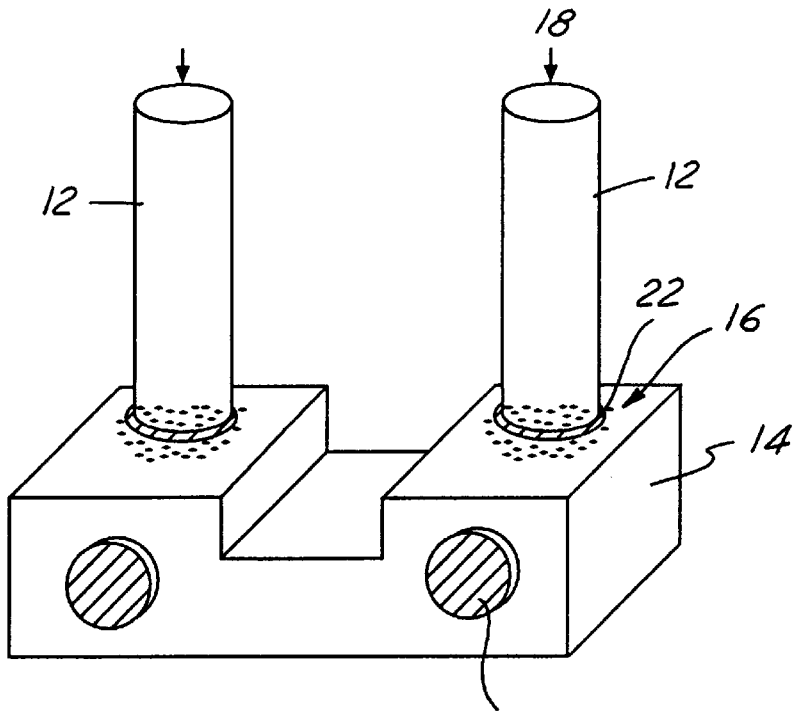
FIG. 1 is a partial perspective view of a tube-manifold assembly.
Figure 2:
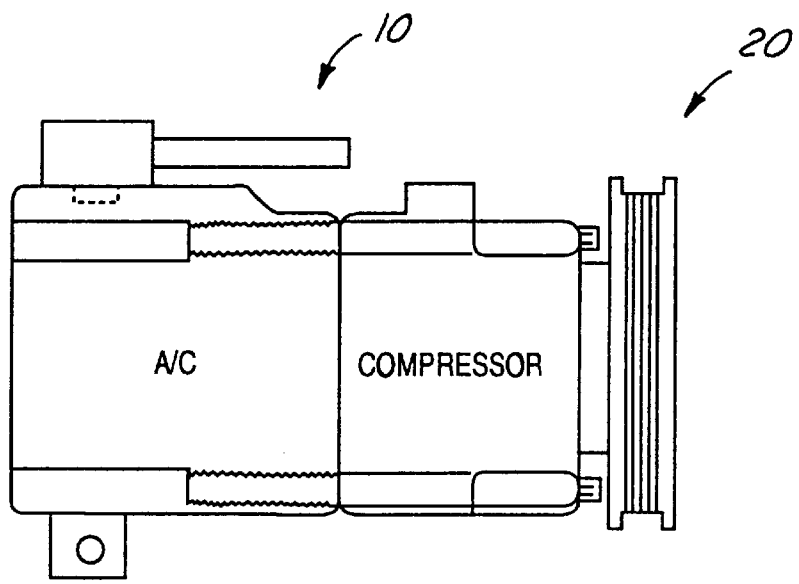
FIG. 2 is a partial perspective of the FIG. 1 tube-manifold assembly as part of an air-conditioner assembly.

Referring to FIG. 1, one embodiment of an assembly 10, according to the present invention, is shown. In this example, the assembly 10 is a tube-to-manifold assembly. As is appreciated from FIGS. 1 and 2, the assembly 10 may be a sub-component affixed to a main component such as a parallel flow condenser, serpentine evaporator, heater core, transmission oil cooler, or air-conditioning compressor (as shown in FIG. 2) of a vehicle such as an automotive vehicle (not shown).

Referring to FIG. 1, the assembly 10 includes at least one, preferably a plurality of tubes 12 and a component, herein being a manifold block 14, made of aluminum based material. By "aluminum based" with respect to the tube, and components like the manifold block as used in this invention is meant that the aluminum based composition comprises mostly aluminum, but may be alloyed with other metals like silicon, copper, magnesium, zinc and so forth.

Each tube 12 extends longitudinally and is generally cylindrical in shape. Often the tubes are about ¼ to 1 inch in diameter. The wall thickness of the tubes is generally ¹⁄₁₆ to ⅛ inches. None of these dimensions is however critical to the invention process. The aluminum based material of tube 12 is preferably selected from the Aluminum Association 1XXX, 3XXX, 5XXX and 6XXX series aluminum alloys, preferably being 6XXX aluminum alloy. The aluminum based material may and desirably does include magnesium. Preferably, the aluminum based material includes magnesium in an amount up to about 3% by weight, more preferably being between about 0.4 and 2.5% by weight.

Referring to FIG. 1, the assembly 10 includes at least one aluminum based component 14 disposed adjacent the tube 12, which component is to be joined by brazing to the tube. For example, the assembly 10 may include a manifold block 14 having holes 16 for accepting tubes 12. Each tube 12 has an internal surface 18 and an external surface 20. Filler material 22 is applied to a portion of the external surface 20 of tube 12, the filler material being made of Aluminum Association 4XXX series aluminum alloys. The filler material may conveniently be a filler ring 22 or cladding (e.g., a thermally sprayed coating) or a thin film PVD or electroplated coating. The 4XXX series aluminum alloys include magnesium in an amount generally at least about 0.1 weight percent, preferably the 4XXX filler material used in this invention include magnesium in an amount of between about 0.1 and 1.5 weight percent of the aluminum alloy. As disclosed above, magnesium alloyed into the aluminum increased the strength of the aluminum. The 4XXX alloys often additionally include amounts of one or more of lithium, sodium, zinc, manganese, copper, boron, and silicon to further modify the aluminum properties. Such aluminum materials are well known in the art. Optimally, this filler material is a filler ring and preferably is made of about 0.04–0.125" diameter wire. As would be apparent to those skilled in the art in view of the present disclosure, the ring or cladding is applied in the area of the intended joint between the tube 12 and the hole 16 of manifold block 14. During the brazing process, the filler material ring melts and flows into the joint between the tube 12 external surface 20 and the hole 16 to seal the joint.

The tube 12 is then positioned so that the filler material 22 is adjacent the aluminum based component, in this embodiment being the manifold block 14. Preferably, the component manifold block 14 is made of the 6XXX Aluminum Association series aluminum alloys. Optimally, both the tube 12 and manifold block 14 are made of 6XXX aluminum alloys. To form the precursor assembly, a modified aluminum brazing flux 28 is applied to a joint between the tube 12 and any component to be joined to the tube 12 by brazing, e.g., manifold block 14. The flux can be applied onto the joint area by any means such as brushing, dipping, and water based spray or electrostatic spray, the latter being preferred because it provides more uniform application.

The modified aluminum brazing flux of the present invention may be formed using a convention KALF aluminum flux such as Nocolok™ but critically must include additives added into this flux selected from cesium fluoride, lithium fluoride or their mixture. The modified flux used in the invention preferably includes at least cesium fluoride. This is because cesium fluoride has a melting point lower than lithium fluoride. These additives would melt and flow into the joint area readily to dislodge any aluminum oxide or magnesium oxide present in the joint area so as to allow formation of a sound braze joint. Either of these fluorides or their mixture is included in the modified aluminum flux in an amount of at least about 1 weight percent based on the total weight of the flux. More preferably, the cesium fluoride, lithium fluoride or their mixture is present in the modified flux in an amount of about 1 to 30% by weight, more preferably from about 3 to 15 wt. %, most preferably being about 6 to 11% by weight. When a mixture of cesium and lithium fluoride are included in the modified flux, they are optimally present in a ratio of from 1:1 to 3:1. It is sometimes advantageous to employ a mixture because this allows the flux to be provided with an optimal flux melting temperature based on the particular mixture and part geometry to account for heat-up during flame brazing.

For manufacture of the assembly 10, the tube 12 and manifold 14 are joined to each other using, in general, the procedure of conventional open-air flame brazing process. Convention open-air brazing is known to those skilled in the art. However, the present invention differs in significant respects from the conventional open-air process. We unexpectedly found that to form sound braze joints it was critically necessary for the temperature ramp-up during brazing to be significantly accelerated over that conventionally used during open-air brazing. Usually, during the open-air brazing process the elevated temperature of the furnace, i.e., after it has been raised to about 450° C., is further raised from about 450° C. to 600° C. in a period of about 1 to 2 minutes. We found, in contrast, that this temperature increase must take place in about 15–20 seconds. Thus it is necessary to ramp up the temperature from 450° to 600° C. at least about four times as fast as is conventionally done in open-air brazing. Otherwise, we found that a sound joint using open-air brazing with the aluminum will not be attained.

It is imperative for the present invention that the heating rate during the brazing method be significantly accelerated in order to reach the melting point of the 4XXX filler material while the modified KALF flux is still molten and fluid on the surface of the aluminum. While not wishing to be bound by theory, we believe that our new process is able to provide sound joints because during the rapid ramping from 450°–600° C. in 15–20 seconds, the modified flux melts, wets the surface, removes the oxide and within this shortened time, allows for the molten 4XXX filler metal to melt, wet, and form the braze joint. In addition, to requiring the accelerated ramping of the brazing temperature, it is also critically necessary that the present method use the modified flux disclosed herein which includes lithium or cesium fluoride. As discussed above, this modified flux has special properties including a lowered melting point which synergistically act with the accelerated heating of the assembly to provide an excellent joint. Neither an understanding nor validity of this theory is however necessary for the practice of the method of this invention.

In one embodiment of the open-air brazing method of this invention, the precursor assembly 10, with flux applied in the areas of the joint to be formed is placed on a braze holding furnace fixture and preheated, for example, to a temperature in a range from about 200° C. to about 450° C. The heat exchanger assembly 10 and a braze holding furnace fixture are transferred to a prebraze chamber where it is soaked for about 3–15 minutes at about 400° C. Subsequently, the tube-manifold assembly 10 and braze holding furnace fixture are transferred to a conveyor and moved through a open-air furnace. In the furnace, the tube-manifold assembly is preheated to 450° C. in a reasonable time generally 3–15 minutes and after reaching 450° C., the assembly temperature is ramped rapidly from 450° C. to about 600° C. in about 15–20 seconds. It is optimally held at about 600° C. for 1–2 minutes, then cooled to room temperature. By ramping rapidly from 450°–600° C., the flux melts, wets the surface, removes the oxide and within a shortened time, allows for the 4XXX filler metal which has become molten to wet, and form the braze joint. This brazed assembly can then be removed from the furnace, cooled, and applied for its intended use.

By adding lithium fluoride and/or cesium fluoride to the aluminum brazing flux in the various proportions disclosed, we have found that the melting point of the flux is significantly lowered. Because this modified flux is thus able to melt earlier in the brazing process, it is able to begin earlier to remove detrimental oxides from the aluminum surface. These additives act significantly to reduce surface magnesium oxide and the KALF portion of the flux to significantly reduce surface aluminum oxide thus allowing the filler metal to continuously wet the oxide free surfaces of the aluminum joint area.

Figure 3:
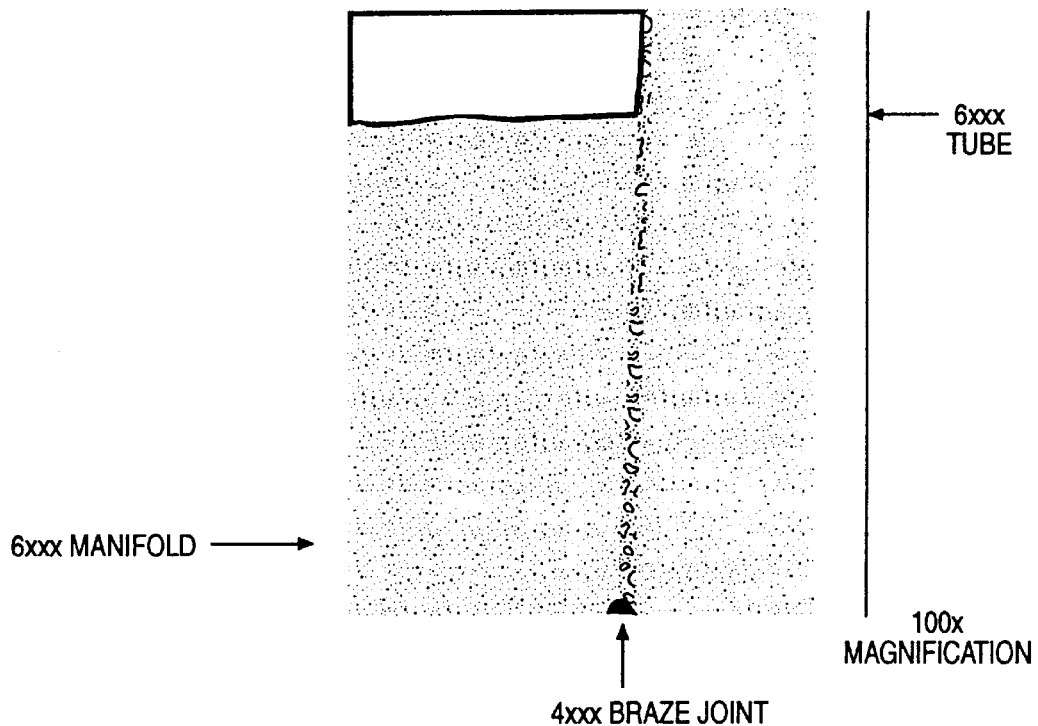
FIG. 3 is a cross section optical micrograph of a tube to manifold braze joint in an assembly not according to the present invention.
Figure 4:
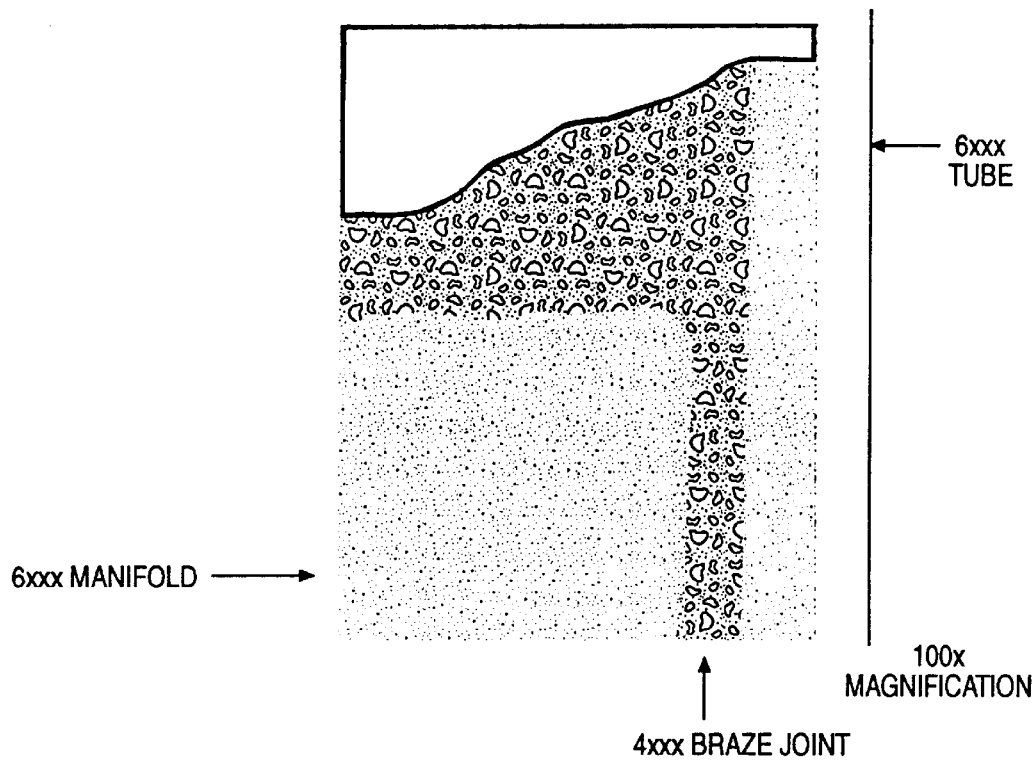
FIG. 4 is an optical micrograph of a tube to manifold braze joint in an assembly according to an embodiment of the present invention.

The superior quality of the joint formed in tube to manifold assemblies when using the flame-brazing method of the present invention is shown in FIG. 4 as compared to a tube to less than desirable manifold assembly joint made by conventional flame-brazing method, shown in FIG. 3. These figures are optical micrographs, 100×magnification.

In forming the FIG. 3 joint, the ramping of the temperature from 450° C. to 600° C. during brazing was conventional, i.e. about 2–3 minutes, which was much longer than that of the present invention rapid ramp-up. We believe that the resultant braze joint was poor as seen in FIG. 3 due to: 1) the relatively long (slow) temperature ramp-up which allowed significant MgO formation on the 6XXX tube aluminum surface, 2) the slow ramp-up allowed the unmodified Nocolok flux to melt, but it melted much later in the braze cycle only when a much higher temperature, i.e., 565°–575° C. was attained, and because the unmodified flux is not particularly effective to reduce high levels of MgO 3) the MgO was still present or may have regrown during the 2–3 minute ramp. As a result, the 4XXX filler metal, supplied in the form of a braze ring, was not able to effectively wet the surfaces of the mating components and formed a visibly poor braze joint.

In the braze joint of FIG. 4, manufactured according to an embodiment of the present invention method, in distinct contrast, the braze joint was excellent, due in part to the accelerated ramping of the temperature during the brazing process. This tube to manifold assembly was made by 1) assembling the tube, filler ring, manifold block assembly, 2) applying a 10% LiF-1%CeF-KALF flux mixture to the assembly joint, 3)ramping through the 450°–600° C. temperature in a rapidly accelerated time of 15–20 seconds, and 4) holding at the braze temperature for about 1–2 minutes which allows time for the filler metal to flow, wet and form the braze joint. In the FIG. 4 optical micrograph, the large fillet that formed between the two mating parts, the tube and manifold, can be clearly seen. There are several features worth noting in this figure, including the amount of the 4XXX filler ring metal flow, the improved wetability, and the desirably increased size of the fillet. Because of all of these features of the braze joint, the resulting braze joint is of much higher quality than that of the FIG. 3 comparative example. Because the lithium and/or cesium modified aluminum fluxes have lower surface tension when melted than the melted unmodified flux, they wet the joining surfaces well and advantageously form fillets of increased size at the joints. Since this process allows for the sound brazing of even high magnesium aluminum alloys like the 6XXX series, the assembly will be capable of significantly higher strength than with conventional open-air brazing methods.

These high magnesium-aluminum materials, which provide excellent strength to the tube and manifold, without the present invention method would be difficult or impossible to braze into sound joints using open-air brazing. That is, the use of relatively high levels of magnesium in the 6XXX alloys for enhanced alloy strength also alloys for the increased amounts of MgO when the magnesium migrated to the aluminum surface during brazing. As it oxidizes to MgO, its presence on the aluminum surface interferes with the formation of sound joints. The use of the modified flux and accelerated ramping temperature allows, however, for sound joints according to the present invention open-air brazing method.

The present invention has been described in an illustrative manner. Terminology which has been used is intended to be in the nature of words of description rather than of limitation.

Many modifications and variations of the present invention are possible in light of the above teachings. Therefore, within the scope of the appended claims, the present invention may be practiced other than as specifically described.

We claim:

1. An open-air brazing method for manufacturing an assembly for an automotive vehicle, said method comprising the steps of:

providing at least one aluminum based tube having an internal surface and an external surface;

applying Aluminum Association 4XXX aluminum based filler material to at least a portion of the external surface of said tube;

disposing at least one aluminum based component adjacent the filler material;

applying a modified aluminum brazing flux to a joint between the at least one tube and the at least one component to form a precursor assembly, said brazing flux comprising cesium fluoride, lithium fluoride, or their mixture added into a potassium fluoaluminate flux in an amount of at least 1% by weight of the modified flux; and joining the at least one tube and at least one component together using open-air brazing which comprises subjecting the precursor assembly in a furnace to temperatures which are raised from about 450° C. to about 600° C. in about 15 to 20 seconds.

2. The method for manufacturing an assembly as set forth in claim 1 wherein said fluorides present in said modified aluminum flux are within a range from about 1 to 30 weight percent and based on the total weight of said flux.

3. The method for manufacturing an assembly as set forth in claim 1 wherein said at least one aluminum based tube comprises material selected from the Aluminum Association 1XXX, 3XXX, 5XXX and 6XXX series aluminum alloys.

4. The method for manufacturing an assembly as set forth in claim 1 wherein said at least one aluminum based component comprises a manifold assembly for air conditioners.

5. The method for manufacturing an assembly as set forth in claim 1 wherein said at least one aluminum based component comprises material of the Aluminum Association 6XXX series aluminum alloys.

6. The method for manufacturing an assembly as set forth in claim 1 wherein said modified aluminum brazing flux is made by mixing cesium fluoride or lithium fluoride or their mixture into Nocolok™ flux.

7. The method according to claim 1 wherein said filler material is a ring made of wire.

8. The method according to claim 7 wherein said wire has a diameter between 0.040 and 0.125 inches.

9. The method according to claim 1 wherein the assembly is further held at about 600° C. for 1–2 minutes.

10. The method according to claim 1 wherein the open-air brazing process comprises moving the precursor assembly through an open-air brazing furnace on a conveyor.

11. An open-air brazing method for manufacturing an assembly for an automotive vehicle, said method comprising the steps of:

providing at least one aluminum based tube having an internal surface and an external surface;

applying Aluminum Association 4XXX aluminum based filler material to at least a portion of the external surface of said tube;

disposing at least one aluminum based component adjacent the filler material;

applying a modified aluminum brazing flux to a joint between the at least one tube and the at least one component to form a precursor assembly, said brazing flux comprising cesium fluoride, lithium fluoride, or their mixture added into a potassium fluoaluminate flux in an amount of at least 1% by weight of the modified flux; and joining the at least one tube and at least one component together using open-air brazing which comprises:

heating the precursor assembly to a temperature of up to about 450° C. in an open-air furnace;

elevating the temperature in the furnace from about 450° C. to about 600° C. in about 15 to 20 seconds;

maintaining the furnace temperature at a temperature of at least about 600° C. for a time sufficient to complete formation of a braze joint; and removing the assembly from the furnace.

* * * * *